United States Patent [19]

Riegler et al.

[11] 4,089,611
[45] May 16, 1978

[54] RELEASABLE HUB-SHAFT CONNECTION MECHANISM

[75] Inventors: Ernst Riegler, Enns; Manfred Schmidt, Linz, both of Austria

[73] Assignee: Vereinigte Osterreichische Eisen- und Stahlwerke Alpine Montan Aktiengesellschaft, Linz, Austria

[21] Appl. No.: 749,107

[22] Filed: Dec. 9, 1976

[30] Foreign Application Priority Data

Dec. 17, 1975 Austria .................. 9572/75

[51] Int. Cl.² .............................................. F16D 1/06
[52] U.S. Cl. ........................................ 403/358; 403/367
[58] Field of Search ............... 403/356, 358, 350, 351, 403/352, 374, 367

[56] References Cited

U.S. PATENT DOCUMENTS

| 958,440 | 5/1910 | Sackman | 287/DIG. 8 |
|---|---|---|---|
| 1,806,694 | 5/1931 | Markson | 287/DIG. 8 |
| 2,114,210 | 4/1938 | Cambridge | 403/367 |
| 2,127,053 | 8/1938 | Cambridge | 403/356 |
| 2,332,270 | 10/1943 | Shaw | 403/358 |

FOREIGN PATENT DOCUMENTS

| 54,582 | 12/1890 | Germany | 403/350 |
|---|---|---|---|
| 238,974 | 9/1925 | United Kingdom | 403/356 |

Primary Examiner—Andrew V. Kundrat
Attorney, Agent, or Firm—Brumbaugh, Graves, Donohue & Raymond

[57] ABSTRACT

A releasable hub-shaft connection mechanism for transmitting strong torques has a shaft, a hub surrounding the shaft, and at least one bore that penetrates the shaft and the hub. The bore turns into a recess in the region of one of the front faces of the hub and has an axis parallel to the axis of the shaft. An eccentric clamping bolt is inserted in the bore and has an eccentric head portion which is rotatable into a clamping position relative to an engaging face of the recess.

8 Claims, 4 Drawing Figures

RELEASABLE HUB-SHAFT CONNECTION MECHANISM

BACKGROUND OF THE INVENTION

The invention relates to a releasable hub-shaft connection, in particular a connection to be used in the construction of heavy machinery, for transmitting strong torques, wherein at least one bore is provided, with its axis extending parallel to the direction of the axis of the shaft and penetrating the shaft and the hub for accommodating a clamping bolt.

For transmitting strong torques between the hub and shaft, hitherto, press fit or tangential key connections have been used in the construction of heavy machinery, such as rolling mills and converters.

While, press fits have the advantage that the hub and shaft can be quickly released and connected, i.e., after a release no subsequent treatment is necessary for making a renewed connection, they have the disadvantage that their production is expensive and complex, since narrow tolerances have to be observed. Accordingly, a large number of rejected pieces are obtained, which increases the costs of production.

When conventional tangential keys are used, disadvantages occur, which mainly consist in that, on the one hand, the assembly of hub and shaft requires a fitting operation for the keys which takes a lot of time and, on the other hand, it is hardly possible to disassemble them. For a disassembly, the keys have to be drilled out. If the hub is to be mounted again, new keys have to be fitted. A further disadvantage of the tangential key connection consists in that the sharp-edged notches in the shaft and hub cause tension peaks, which require a wider diameter for the shaft and a thicker and stronger hub wall.

Furthermore, various hub-shaft connections have been known, which are provided with bores extending parallel to the direction of the axis of the shaft and which penetrate half the shaft and half the hub along the periphery. In these bores, clamping bolts are insertable, which bolts consist of a slit expanding or clamping bushing having a tapering inner face and a central tapering pin that can be tightened relative to the bushing (German Offenlegungsschrift No. 24 45 252). For releasing the hub-shaft connection, the tapering pin must be pushed out of the expanding or bracing bushings, respectively, in the direction of the axis of the shaft.

SUMMARY OF THE INVENTION

The invention aims at preventing these disadvantages and difficulties and has as its object to provide a releasable hub-shaft connection, wherein the connection can be produced in a simple manner without having to observe narrow tolerances for the connecting elements, the mounting of the hub on the shaft can be carried out quickly and easily, and it is also possible to frequently release and re-connect the hub shaft-connection without subsequent treatment. Furthermore, tension peaks in the hub and shaft due to sharp-edged notches are to be avoided, so that slight thicknesses of the hub wall and narrow diameters of the shaft suffice.

According to the invention these objects are achieved in that the bore becomes a recess in the region of the front face of the hub and an eccentric bolt with an eccentric head portion is inserted in the bore, wherein the eccentric bolt with its head portion can be turned into a clamping position relative to an engaging face of the recess.

Suitably, the engaging face of the recess is arranged offset in the peripheral direction of the shaft relative to the axis of the bore.

Suitably, an even number of bores is provided, wherein the engaging faces of half the number of the recesses are oppositely directed to the engaging faces of the remaining recesses in the peripheral direction.

It is advantageous, if the bore and the recess have equal lengths.

Making the hub-shaft connection is especially easy, if the eccentric head portion of the eccentric bolt is cylindrical and the engaging face of the recess is shaped like a hollow cylinder.

If in the clamping position of the eccentric bolt, an angle enclosed between the plane — constituted by the axis of rotation of the eccentric bolt and the line of contact between the head portion of the bolt and the engaging face of a recess — and the plane laid through this line of contact and extending perpendicularly to the engaging face of the recess, is smaller than the angle of friction resulting from the friction between the head portion of the eccentric bolt and the engaging face of the recess, self-inhibition occurs.

If in the clamping position of the eccentric bolt, the force caused by a torque acting on the shaft or the hub encloses an angle with the plane laid through the line of contact between the head portion and the engaging face of the recess and extending perpendicularly to the engaging face of the recess, which angle is smaller than the pertaining angle of friction, the connection cannot be released by any torque acting on the shaft or on the hub.

BRIEF DESCRIPTION OF THE DRAWINGS

The invention shall now be described by way of example only and with reference to the accompanying drawings, wherein.

DESCRIPTION OF AN EXEMPLARY EMBODIMENT

Figure 3:
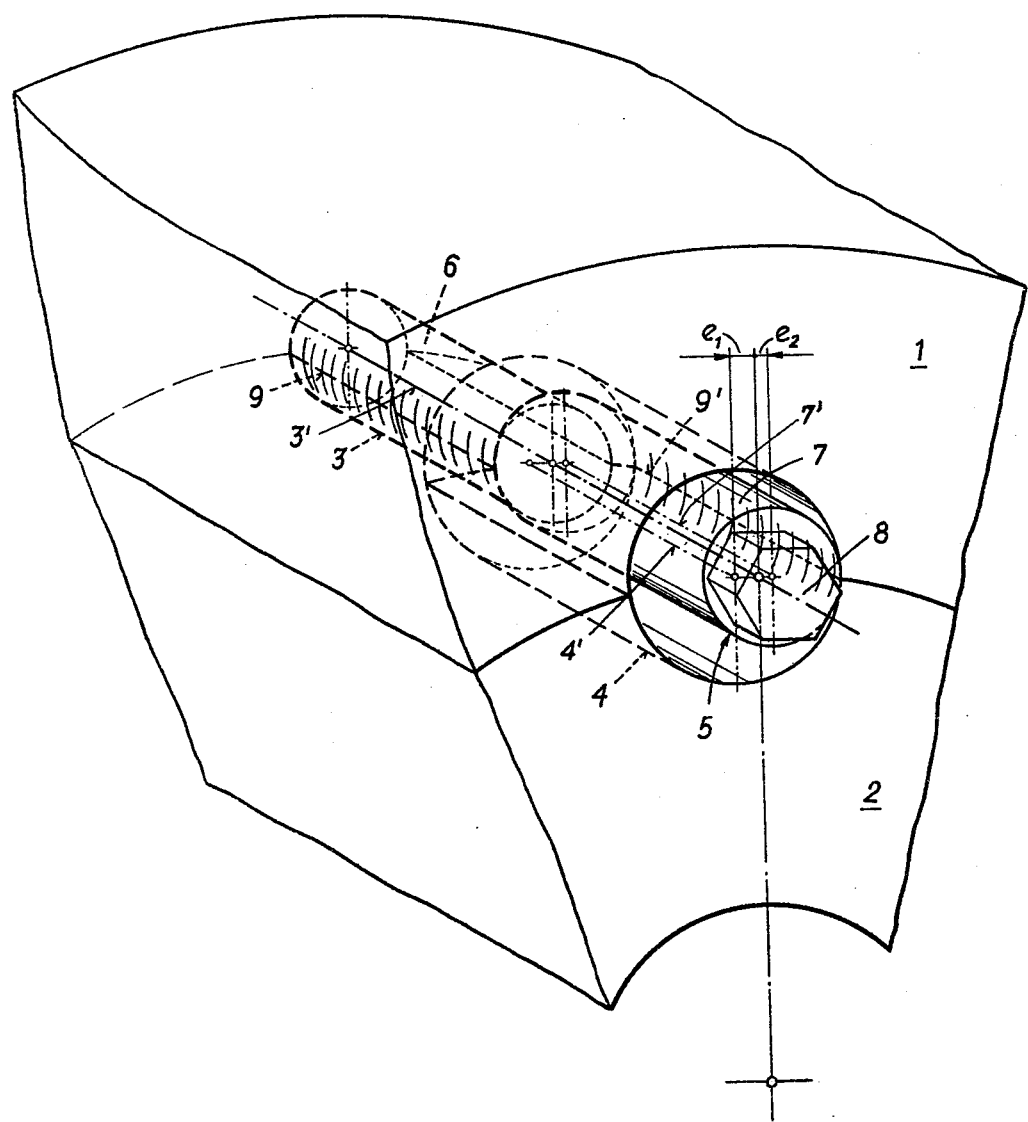
FIG. 3 is a partial section of the hub-shaft connection in an inclined view and on an enlarged scale, and FIG. 4 schematically illustrates the clamping position of an eccentric bolt in an illustration analogous to FIG. 2, also on an enlarged scale.

A hub 1, of a toothed wheel, e.g., is slipped into the end of a shaft 2. The fit between hub and shaft is not important for transmitting torques and, therefore, a fit with relatively wide tolerances, such as a sliding seat fit, which is easy to make and easy to mount, may be provided. Four bores 3, evenly distributed around the periphery of the shaft, have axes 3' parallel to the direction of the axis of the shaft and arranged at the periphery thereof. Each bore penetrates the hub and the shaft, i.e., they extend with one half of their periphery in the hub and one half in the shaft. A separate recess 4 having a cylindrical cross-section and an axis 4' is eccentrically located with respect to each one of these bores and the eccentricity $e_1$ is arranged in the direction along the periphery of the shaft. The bores 3 and the recesses 4 have equal lengths, i.e., they each extend over half the length of the hub. Eccentric bolts 5 each penetrate the bores 3 and the recesses 4. The cylindrical bolt portions 6 of bolts 5 are rotatably inserted in the bores 3 which have corresponding diameters. The cylindrical head portion 7 of the eccentric bolt 5 is arranged to be offset so that its axis 7' has an eccentricity $e_2$ relative to the cylindrical bolt portion 6. The eccentric bolts 5 at the front faces of their head portions 7 are each provided with a hexagon 8, to which a tool for rotating the eccentric bolt is attachable. The diameters of each head portion 7 and the recess 4 are so dimensioned that the head portions 7 can be pressed toward the recess 4 by rotating the eccentric bolt 5. According to the clamping position illustrated in FIG. 3, the head portion 7 presses against the wall of the recess 4 when eccentricity $e_1$ is approximately oppositely directed to eccentricity $e_2$. This need not be the case, but it has the advantage that the eccentric bolt cannot be rotated out of the clamping position by a torque acting on the shaft or on the hub. The cylindrical bolt portion 6 in this clamping position of the eccentric bolt 5 presses against the wall of the bore 3 arranged opposite the engaging face of the recess 4 along a line 9. Theoretically speaking, a contact between the head portion 7 and the wall of the recess 4 would only take place along a line 9', but due to elastic deformation, a two-dimensional contact occurs. These areas of contact or engagement, respectively, are entered in FIG. 3 in hatching for a better illustration. By rotating all the eccentric bolts with a certain torque, a uniform fit of all the eccentric bolts 5 can be obtained.

When a torque occurs, the eccentric bolts are further elastically deformed, until the force resulting from the deformations as well as from the counter-moment balances the torque, i.e., the eccentric bolts act as elastic members between the hub and shaft. The bolts are dimensioned in such a manner, that when the highest torque to be expected occurs, they are not plastically deformed.

Forces occuring in the direction of the axis of the shaft are transmitted by the friction forces acting on the contacting or engaging faces, respectively.

The number of eccentric bolts depends on the magnitude of the torque to be transmitted.

To secure the eccentric bolts in the clamping position against rotation, the usual screw head safety means can engage on the hexagons, such as wire safety means or fixing keys.

Figure 1:
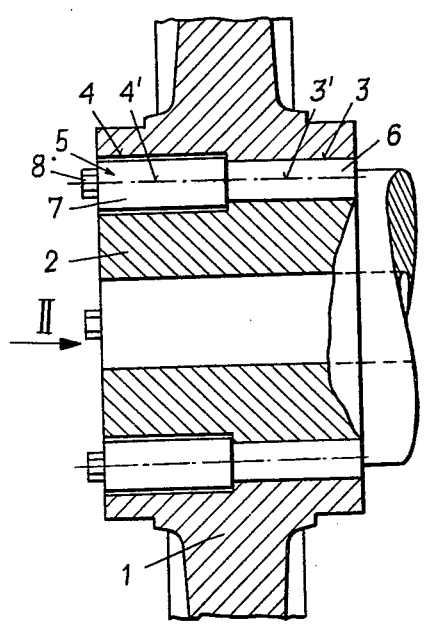
FIG. 1 is a section through the longitudinal axis of the hub-shaft connection.
Figure 2:
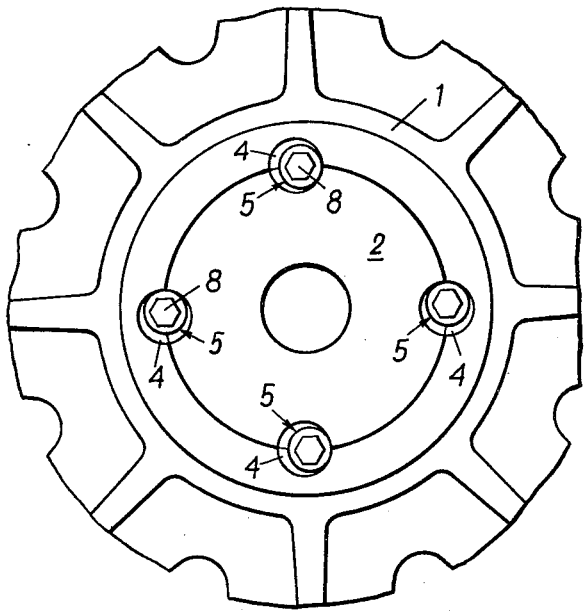
FIG. 2 is a view in the direction of the arrow II of FIG. 1.
Figure 4:
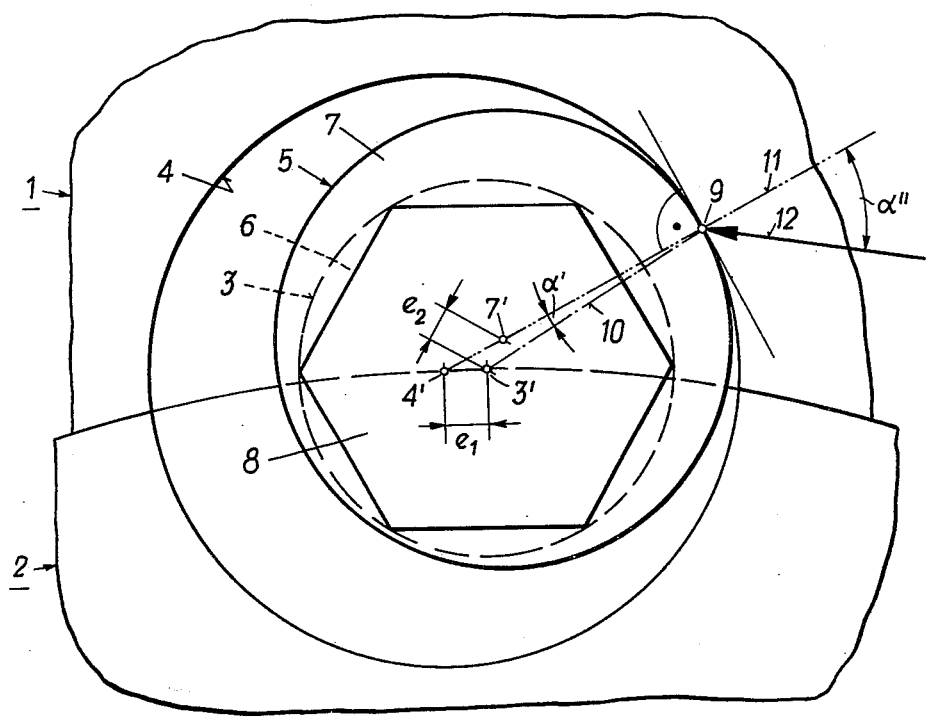

The eccentric head portion of the eccentric bolts as well as the recesses 4 need not have a certain configuration, i.e., they could also have a cross-section other than a circular one. In FIG. 4, the angle enclosed by plane 10 — formed by the axis of rotation 3' of the eccentric bolt 5 and the line of contact 9' of the head portion 7 with the engaging face of the recess 4 — with the plane laid through this line of contact and extending perpendicularly to the engaging face of the recess 4, is denoted by $\alpha'$. If this angle $\alpha'$ is smaller than the angle of friction resulting from the friction between the eccentric bolt and the engaging face of the recess, there is self-inhibition with regard to forces lying in plane 11 and directed perpendicular to axis 7' of the head portion 7.

If, in addition to angle $\alpha'$, also angle $\alpha''$, enclosed by the force 12 caused between a torque acting on the hub and the plane 11 laid through the line of contact 9 and extending perpendicular to the engaging face of recess 4, is smaller than the pertaining angle of friction, the eccentric bolt cannot be brought out of the clamping position by any torque acting on the hub or shaft.

What we claim is:

1. In a releasable hub-shaft connection mechanism, in particular to be used in heavy machinery, for transmitting strong torques, with a shaft, a hub surrounding the shaft, and at least one bore penetrating the shaft and the hub and having an axis that is parallel to the axis of the shaft, a clamping bolt being inserted in said at least one bore, the improvement which is characterised in that:

the at least one bore becomes a recess extending about halfway into the hub and about halfway into the shaft in the region of one front face of the hub, the recess being off-set relative to the axis of the bore in the peripheral direction of the shaft, the recess also having an engaging face at one of the boundaries between the shaft and the hub in the peripheral direction of the shaft; and the clamping bolt inserted in the at least one bore is an eccentric bolt having an eccentric head portion, which eccentric head portion is rotatable into a clamping position relative to the engaging face of the recess.

2. A releasable hub-shaft connection mechanism as set forth in claim 1, wherein the recess is arranged offset relative to the axis of the bore in the peripheral direction of the shaft opposite the eccentric offset of the eccentric head portion.

3. A releasable hub-shaft connection mechanism as set forth in claim 1, wherein an even number of bores is provided, wherein the engaging faces of half the number of recesses in the peripheral direction are oppositely directed to the engaging faces of the remaining half of the number of recesses.

4. A releasable hub-shaft connection mechanism as set forth in claim 1, wherein the at least one bore and the recess have equal lengths.

5. A releasable hub-shaft connection mechanism as set forth in claim 1, wherein the eccentric head portion of the eccentric bolt is designed as a cylinder and the engaging face of the recess is designed as a hollow cylinder.

6. A releasable hub-shaft connection mechanism, in particular to be used in heavy machinery, for transmitting strong torques, with a shaft, a hub surrounding the shaft, and at least one bore penetrating the shaft and the hub and having an axis that is parallel to the axis of the shaft, a clamping bolt being inserted in said at least one bore, the improvement which is characterised in that:

the at least one bore becomes a recess in the region of one front face of the hub, the recess having an engaging face, the clamping bolt inserted in the at least one bore being an eccentric bolt having an eccentric head portion, which eccentric head portion is rotatable into a clamping position relative to the engaging face of the recess; and when the eccentric bolt is in the clamping position, a first plane is present formed by the axis of rotation of the eccentric bolt and the line of contact between the eccentric head portion of the eccentric bolt and the engaging face of the recess, and a second plane is present extending through said line of contact perpendicular to the engaging face of the recess, said first plane and said second plane enclosing an angle, an angle of friction resulting from friction between the eccentric head portion of the eccentric bolt and the engaging face of the recess, said angle enclosed between said first plane and said second plane being smaller than said angle of friction.

7. A releasable hub-shaft connection mechanism as set forth in claim 6, wherein, when the eccentric bolt is in the clamping position, a force caused by a torque that acts on the shaft encloses an angle with said second plane that is smaller than the pertaining angle of friction.

8. A releasable hub-shaft connection mechanism as set forth in claim 6, wherein, when the eccentric bolt is in the clamping position, a force caused by a torque that acts on the hub encloses an angle with said second plane that is smaller than the pertaining angle of friction.

* * * * *